US012207222B2

(12) United States Patent
Zorgui et al.

(10) Patent No.: US 12,207,222 B2
(45) Date of Patent: Jan. 21, 2025

(54) ACCESS POINT ASSISTED POSITIONING FOR A USER EQUIPMENT (UE)

(71) Applicant: QUALCOMM Incorporated, San Diego, CA (US)

(72) Inventors: Marwen Zorgui, San Diego, CA (US); Srinivas Yerramalli, San Diego, CA (US); Xiaoxia Zhang, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/658,768

(22) Filed: Apr. 11, 2022

(65) Prior Publication Data

US 2023/0328678 A1   Oct. 12, 2023

(51) Int. Cl.
*H04W 60/04*  (2009.01)
*H04W 4/029*  (2018.01)
*H04W 48/16*  (2009.01)

(52) U.S. Cl.
CPC .......... *H04W 60/04* (2013.01); *H04W 4/029* (2018.02); *H04W 48/16* (2013.01)

(58) Field of Classification Search
CPC ..... H04W 60/04; H04W 4/029; H04W 48/16; H04W 88/18; H04W 64/00; G01S 5/0009; G01S 5/0236
USPC ..................................................... 455/435.1
See application file for complete search history.

(56) References Cited

PUBLICATIONS

3rd Generation Partnership Project; Technical Specification Group Radio Access Network; NG Radio Access Network (NGx.RAN); Stage 2 functional specification of (Year: 2022).*
3GPP TSG RAN WG1 Meeting #80bis Belgrade, Serbia, Apr. 20-24, 2015 (Year: 2015).*
3GPP TS 38.305: "3rd Generation Partnership Project, Technical Specification Group Radio Access Network, NG Radio Access Network (NG-RAN), Stage 2 functional Specification of User Equipment (UE) Positioning in NG-RAN (Release 17)", V17.0.0 (Mar. 2022), 3rd Generation Partnership Project, Mobile Competence Centre, 650, Route Des Lucioles, F-06921 Sophia-Antipolis Cedex, France, Apr. 8, 2022, XP052134867.
Fraunhofer Iis, et al., "NR DL and UL Positioning: RTT procedure", 3GPP TSG RAN WG2 Meeting #107, R2-1910188, 3rd Generation Partnership Project, Mobile Competence Centre, 650, Route Des Lucioles, F-06921 Sophia-Antipolis Cedex, France, vol. RAN WG2, No. Prague, CZ, Aug. 26, 2019-Aug. 30, 2019, Aug. 15, 2019, XP051767969.
International Search Report and Written Opinion—PCT/US2023/064456—ISA/EPO—Jun. 21, 2023.

(Continued)

*Primary Examiner* — Tanmay K Shah
(74) *Attorney, Agent, or Firm* — QUALCOMM Incorporated

(57) ABSTRACT

In one aspect of the disclosure, a method for wireless communication performed by a user equipment (UE) includes receiving assistance data associated with a positioning procedure. The assistance data indicates one or more access points and further indicates, for each of the one or more access points, a type associated with a connection to a cellular core network. The method further includes performing, based on the assistance data, one or more operations of the positioning procedure with an access point of the one or more access points.

29 Claims, 6 Drawing Sheets

(56) References Cited

PUBLICATIONS

Sony: "Considerations on Utilizing Wi-Fi for Indoor Positioning", 3GPP TSG RAN WG1 Meeting #80bis, R1-151787, 3rd Generation Partnership Project, Mobile Competence Centre, 650, Route Des Lucioles, F-06921 Sophia-Antipolis Cedex, France, vol. RAN WG1, No. Belgrade, Serbia, Apr. 20, 2015-Apr. 19, 2015, Apr. 19, 2015, XP050934648.

* cited by examiner

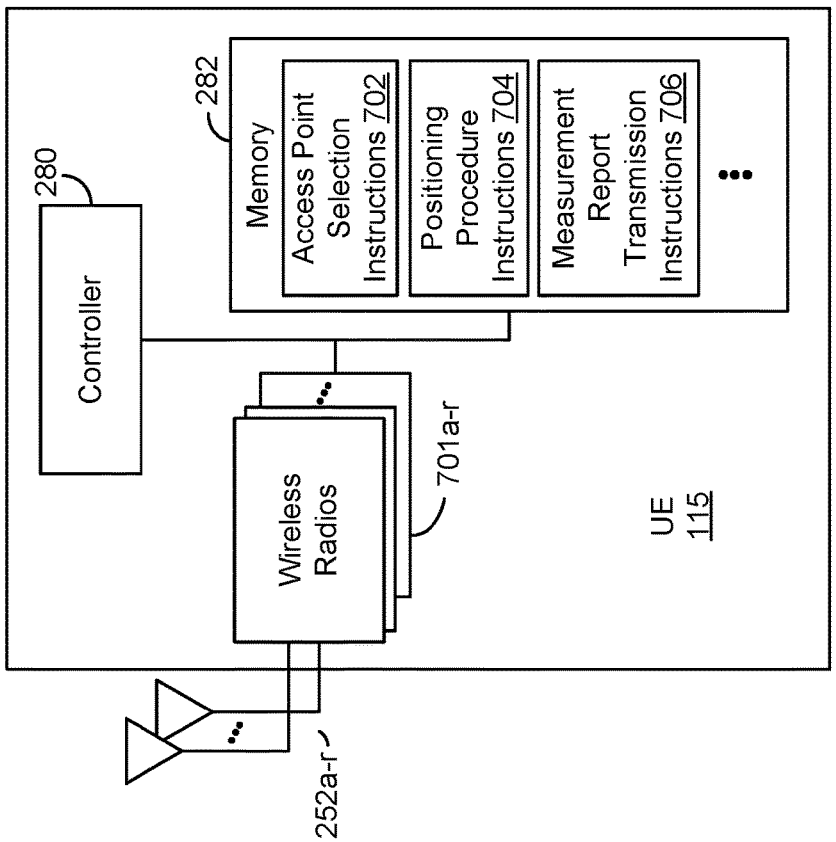
FIG. 7
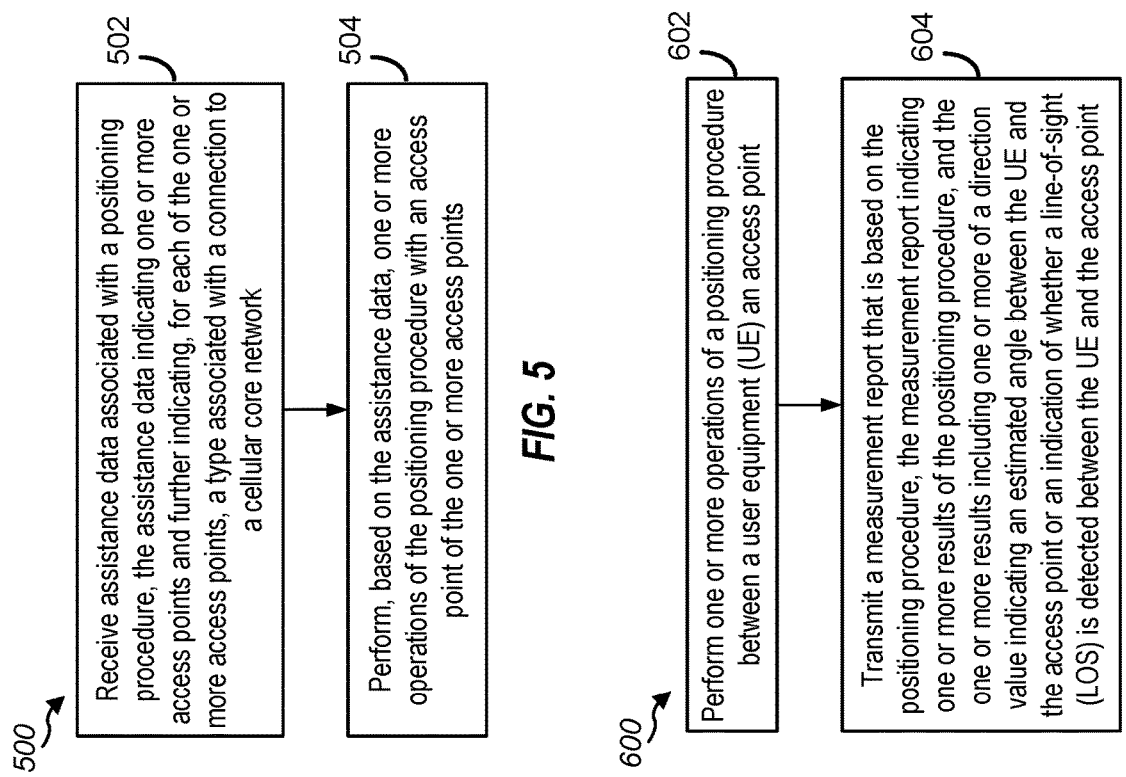
FIG. 5
FIG. 6

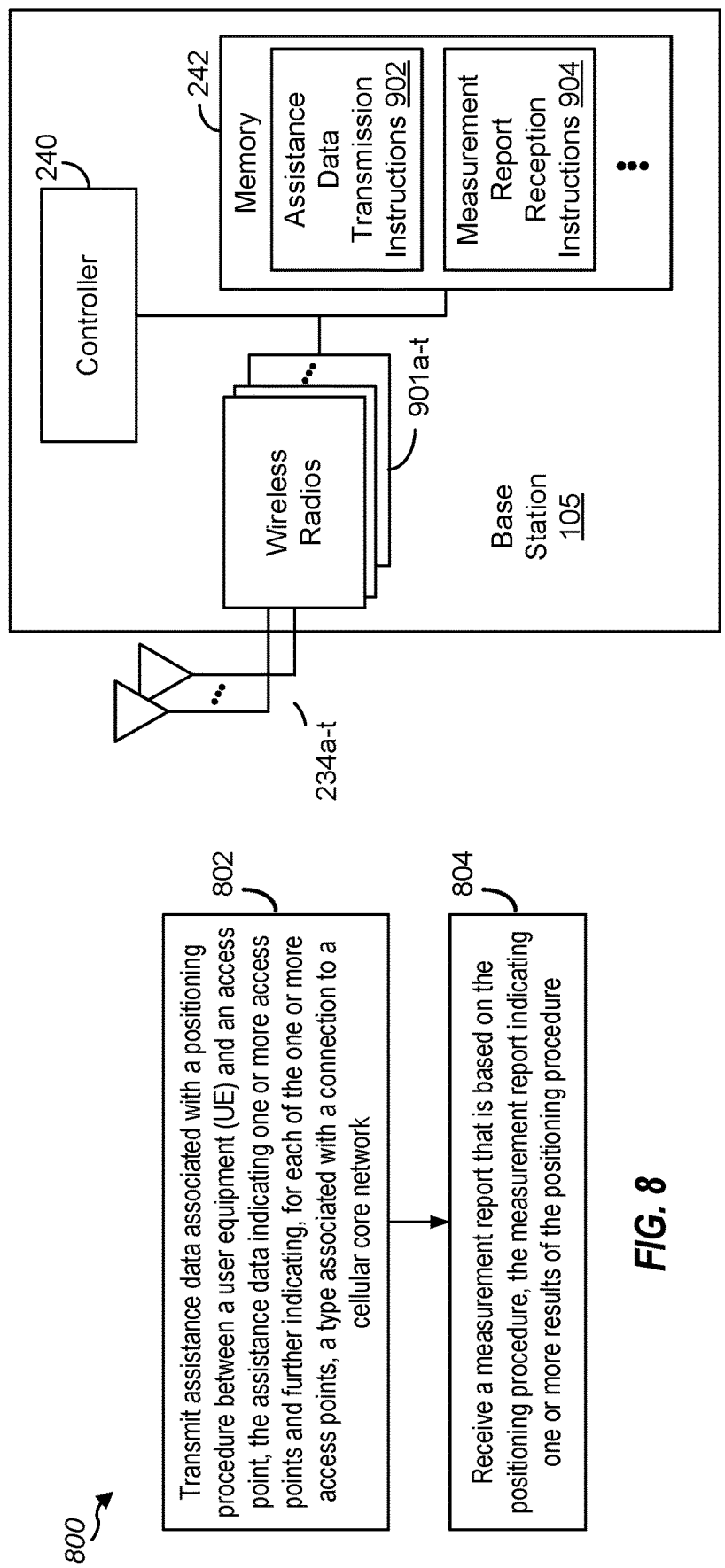

ACCESS POINT ASSISTED POSITIONING FOR A USER EQUIPMENT (UE)

TECHNICAL FIELD

Aspects of the present disclosure relate generally to wireless communication systems, and more particularly, to positioning in wireless communication systems. Some features may enable and provide improved communications, including enhanced positioning of a user equipment (UE).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

With the introduction of 5th Generation (5G) or new radio (NR) networks (sometimes referred to as "5G NR" networks), UEs may have higher capability, higher data rate, and higher bandwidth. Additionally, UEs may also operate in a variety of architectures that provide multiple types of connectivity. As devices continue to become more commonplace, improve, and "do more", scheduling access to a wireless medium and avoiding conflicts becomes more difficult, such as when multiple devices are densely co-located.

For example, a 5G NR network may include or may communicate with one or more servers that include or execute a location management function (LMF). A UE may perform measurements of a positioning reference signal from a base station, and the LMF may receive the measurements and may determine or estimate a position of a UE based on the measurements. For example, the LMF may determine or estimate a position of a vehicle of a vehicle-to-everything (V2X) network or may estimate a positioning of a wireless sensor of an Internet-of-things (IoT) network. As the number of devices in a network increases, more positioning reference signals and measurements may be communicated within a network. As a result, usage of network resources increases, and an amount of processing performed by devices increases, such as by increasing a number of positioning computations performed by the LMF, which may lead to one or more of latency, increased power consumption, or other effects.

BRIEF SUMMARY OF SOME EXAMPLES

In one aspect of the disclosure, a method for wireless communication performed by a user equipment (UE) includes receiving assistance data associated with a positioning procedure. The assistance data indicates one or more access points and further indicates, for each of the one or more access points, a type associated with a connection to a cellular core network. The method further includes performing, based on the assistance data, one or more operations of the positioning procedure with an access point of the one or more access points.

In an additional aspect of the disclosure, an apparatus includes a memory and one or more processors coupled to the memory. The one or more processors are configured to receive assistance data associated with a positioning procedure. The assistance data indicates one or more access points and further indicates, for each of the one or more access points, a type associated with a connection to a cellular core network. The one or more processors are further configured to initiate, based on the assistance data, one or more operations of the positioning procedure with an access point of the one or more access points.

In an additional aspect of the disclosure, a method of wireless communication includes performing one or more operations of a positioning procedure between a UE and an access point. The method further includes transmitting a measurement report that is based on the positioning procedure. The measurement report indicates one or more results of the positioning procedure, and the one or more results include one or more of a direction value indicating an estimated angle between the UE and the access point or an indication of whether a line-of-sight (LOS) is detected between the UE and the access point.

In an additional aspect of the disclosure, an apparatus includes a memory and one or more processors coupled to the memory. The one or more processors are configured to initiate transmission of assistance data associated with a positioning procedure between a UE and an access point. The assistance data indicates one or more access points and further indicates, for each of the one or more access points, a type associated with a connection to a cellular core network. The one or more processors are further configured receive a measurement report that is based on the positioning procedure. The measurement report indicates one or more results of the positioning procedure.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 5 is a flow diagram illustrating an example process that supports access point assisted positioning according to one or more aspects.

FIG. 6 is a flow diagram illustrating another example process that supports access point assisted positioning according to one or more aspects.

FIG. 7 is a block diagram of an example UE that supports access point assisted positioning according to one or more aspects.

FIG. 8 is a flow diagram illustrating an example process that supports access point assisted positioning according to one or more aspects.

FIG. 9 is a block diagram of an example base station that supports access point assisted positioning according to one or more aspects.

Like reference numbers and designations in the various drawings indicate like elements.

DETAILED DESCRIPTION

Figure 1:
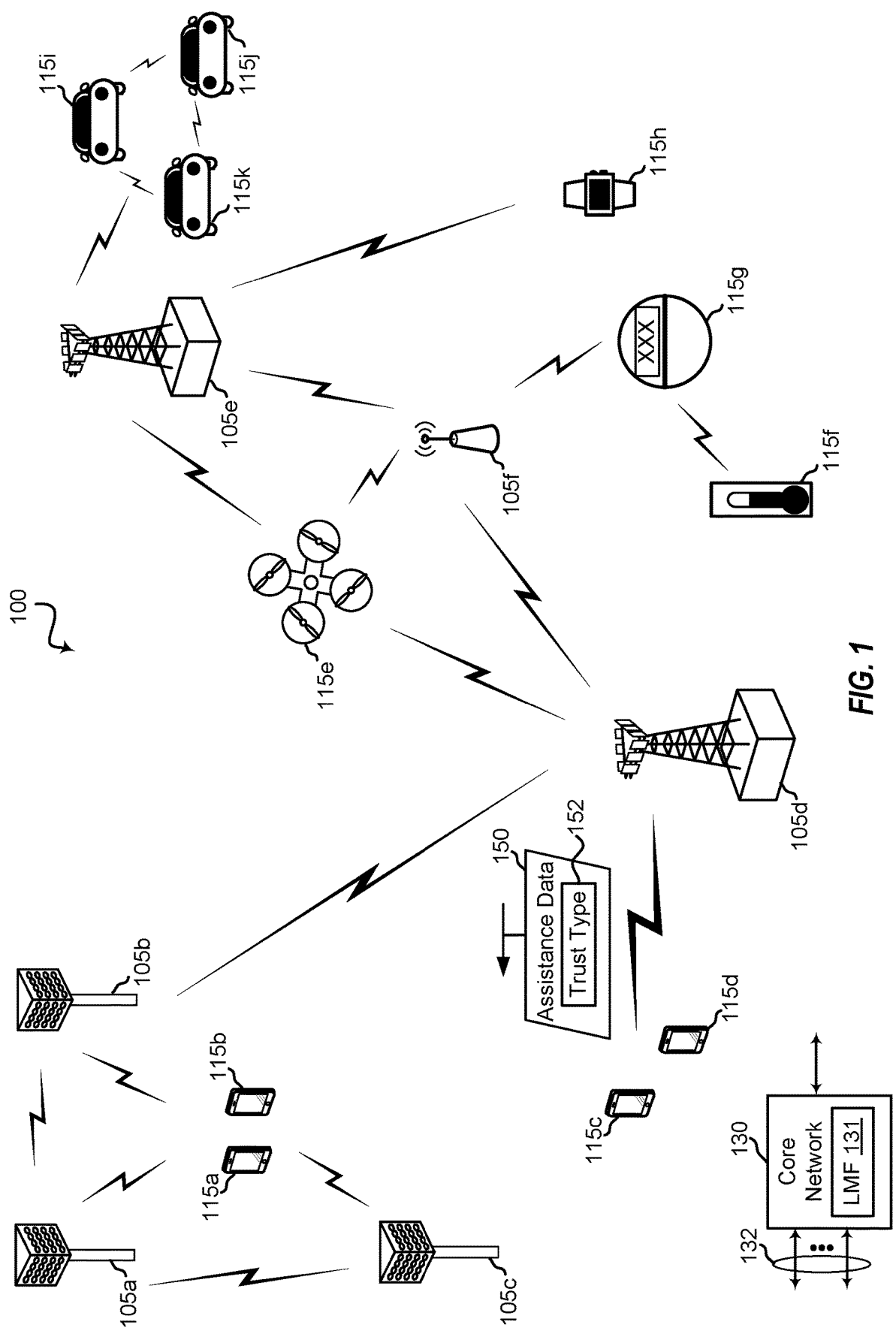
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

A wireless communication system according to some aspects of the disclosure may perform positioning using an access point. For example, a user equipment (UE) may perform a positioning procedure with an access point to determine a ranging value (e.g., an estimated distance between the UE and the access point), and a location monitoring function (LMF) may determine a position of the UE based at least in part on the ranging value.

In some examples, the LMF may provide the UE with assistance data list of one or more access points and an indication of a type associated with each of the one or more access points. For example, the type may include or correspond to a "trust type" that is associated with a type of connection to a cellular core network and that indicates whether an access point is associated with an untrusted status or a trusted status. To illustrate, an access point may be coupled to a cellular core network via an interworking function device, such as a non-3GPP interworking function (N3IWF) device. In such examples, the access point may be referred to as an untrusted access point. In some other examples, an access point may be coupled to the cellular core network via a gateway function device, such as a trusted non-3GPP gateway function (TNGF) device. In such examples, the access point may be referred to as a trusted access point.

In some examples, the LMF may select the one or more access points based on an estimated location of the UE. For example, the estimated location may correspond to or may be based on a serving cell associated with the UE, a tracking area (TA) associated with the UE, or a most recent position of the UE, as illustrative examples.

The UE may select an access point for the positioning procedure based at least in part on the type of the access point indicated by the assistance data. For example, the UE may prefer to communicate with a "trusted" access point instead of an "untrusted" access point, which may enhance privacy or security or which may reduce latency in some implementations. Alternatively or in addition, a reporting entity that transmits a measurement report associated with the positioning procedure may be determined based at least in part on the type of the access point indicated by the assistance data. For example, an untrusted access point may not have connectivity to the LMF, in which case the UE may serve as the reporting entity. As another example, a trusted access point may have connectivity to the LMF, in which case either the UE or the access point may serve as the reporting entity.

Alternatively or in addition to indicating a type associated with an access point, in some aspects, a measurement report may indicate one or more parameters measured or detected during the positioning procedure. For example, the one or more parameters may include one or more of a direction value indicating an estimated angle between the UE and the access point or an indication of whether a line-of-sight (LOS) is detected between the UE and the access point. In some examples, the direction value may indicate one or more of a downlink angle-of-departure (DL-AoD) associated with the positioning procedure or an uplink angle-of-arrival (UL-AoA) associated with the positioning procedure.

One or more aspects described herein may improve operation of a wireless communication system. For example, by indicating a trust type of an access point, a UE may identify a trusted access point for the positioning procedure, which may enhance privacy or security or which may reduce latency in some implementations. Further, by selecting an access point having a connection to the LMF, the access point may perform transmission of the measurement report to the LMF, which may reduce usage of wireless resources of a cellular network in some cases. Accordingly, operation of one or more devices within a wireless communication system may be enhanced.

Alternatively or in addition, reporting of one or more parameters (such as one or more of a direction value or an LOS indicator) may enable the LMF to determine or estimate a reliability or accuracy of one or more results (e.g., a ranging value) of the positioning procedure, which may enable the LMF to weight the one or more results in combination with results of another positioning procedure (such as a 5G NR positioning procedure). In some implementations, based on the measurement report, the LMF may modify one or more subsequent positioning procedures based on an update to the one or more access points indicated by the assistance data. To further illustrate, the LMF may adjust the one or more access points indicated by the assistance data to reduce network traffic, to reduce power consumption of the UE, to reduce a geometric dilution of precisions (GDOP), or to avoid poor channel quality conditions in some cases (such as based on a determination that a link between the UE and the access point may be in NLOS or may be associated with a multipath condition, reducing measurement accuracy or quality). As a result, operation of one or more devices within a wireless communication system may be enhanced.

To further illustrate, one or more aspects described herein may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3 GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a smart energy or security device, a solar panel or solar array, municipal lighting, water infrastructure, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 in some implementations may support communications with ultra-reliable and redundant links for one or more devices, such as UE 115e. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

In some examples, the LMF 131 may transmit assistance data 150 indicating a trust type 152 of at least one access point. The core network 130 may distribute the assistance data 150 to one or more base stations 105, such as the base station 105d. The base station 105d may transmit the assistance data 150 to one or more UEs 115, such as the UE 115c, the UE 115d, one or more other UEs, or a combination thereof.

Figure 2:
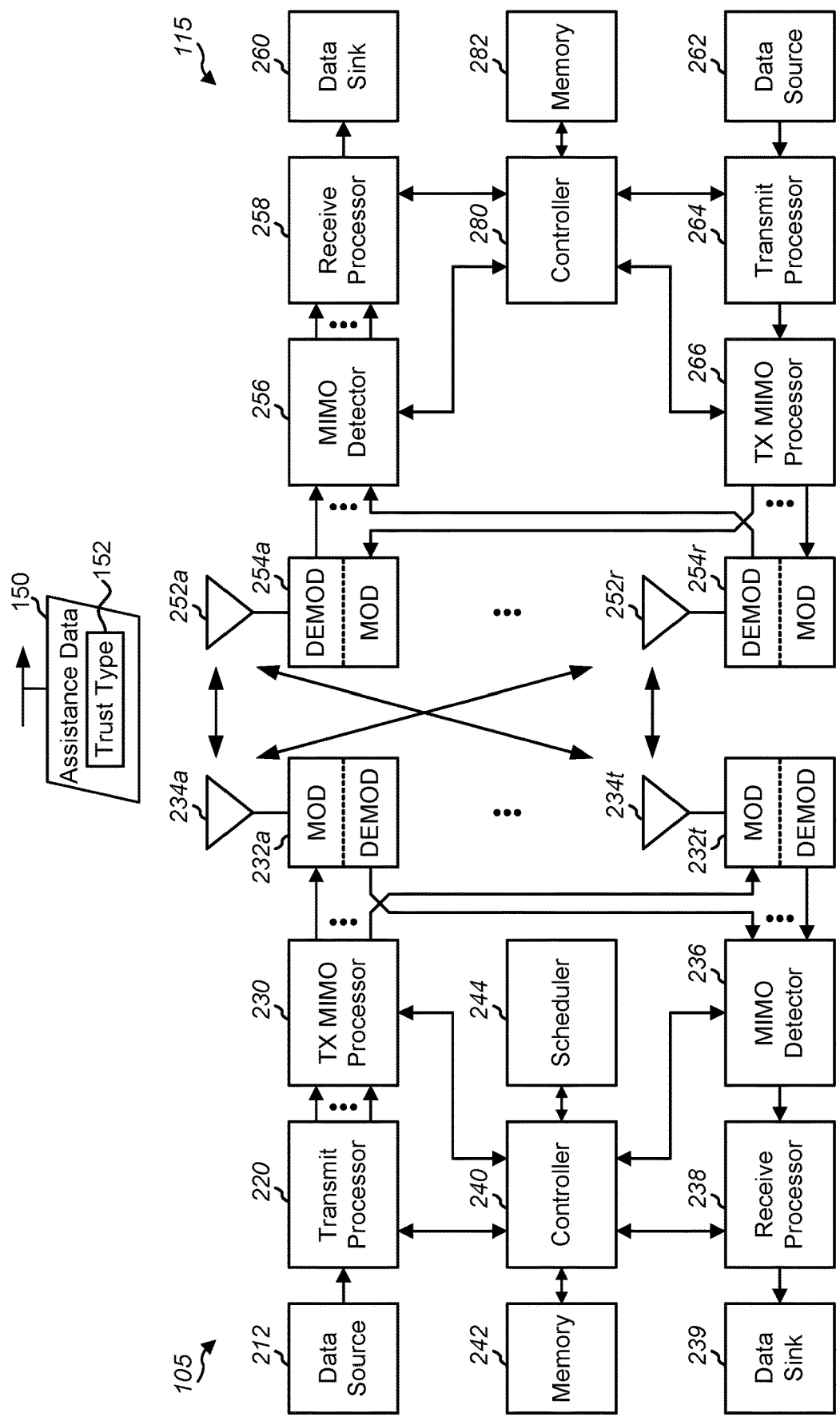
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to initiate, perform, or control transmission or reception of the assistance data 150, one or more other operations, or a combination thereof. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
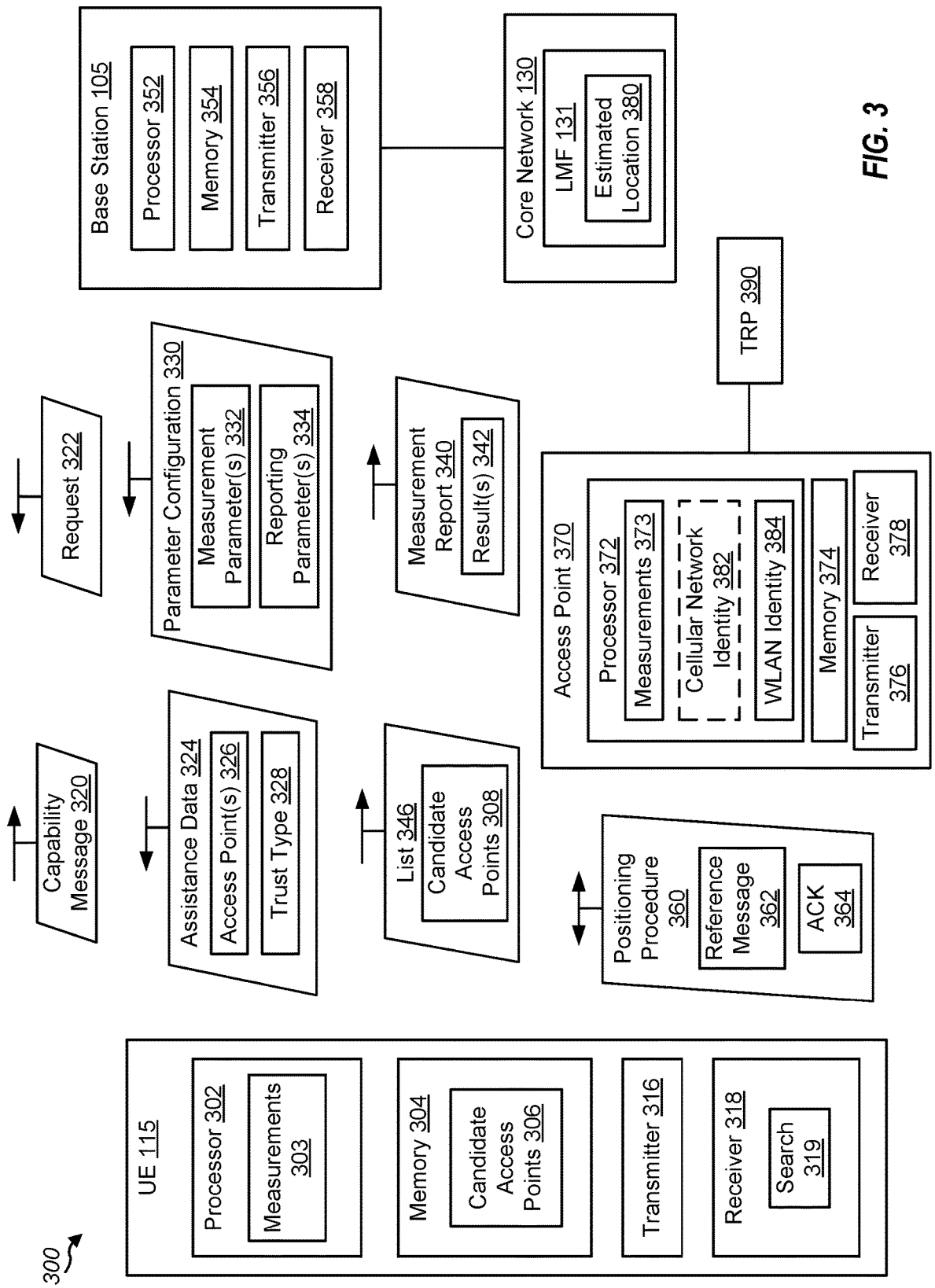
FIG. 3 is a block diagram of an example wireless communications system that supports access point assisted positioning according to one or more aspects.

FIG. 3 is a block diagram of an example wireless communications system 300 that supports access point assisted positioning according to one or more aspects. In some examples, wireless communications system 300 may implement aspects of wireless network 100. Wireless communications system 300 includes UE 115, base station 105, core network 130, and access point 370. Although one UE 115, one base station 105, and one access point 370 are illustrated, in some other implementations, wireless communications system 300 may generally include multiple UEs 115, multiple base stations 105, multiple access points 370, or a combination thereof. FIG. 3 also illustrates that the wireless communications system 300 may include one or more transmission and reception points (TRPs), such as TRP 390.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to initiate, perform, or control one or more operations described herein. In some implementations, processor 302 includes or corresponds to one or more of receive processor 258, transmit processor 264, or controller 280, and memory 304 includes or corresponds to memory 282.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Although transmitter 316 may be described as a single device, transmitter 316 may include multiple transmitters that communicate with multiple different devices using multiple different communication networks. For example, transmitter 316 may include a cellular transmitter that communicates with base station 105 using a cellular communication network and may further include another transmitter that communicates with access point 370 using a wireless local area network (WLAN), such as a Wi-Fi network (Wi-Fi is a trademark of the Wi-Fi Alliance of Austin, Texas), or another network. Further, although receiver 318 may be described as a single device, receiver 318 may include multiple receivers that communicate with multiple different devices using multiple different communication networks. For example, receiver 318 may include a cellular receiver that communicates with base station 105 using the cellular communication network and may further include another receiver that communicates with access point 370 using the WLAN or other network.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to initiate, perform, or control one or more operations described herein. In some implementations, processor 352 includes or corresponds to one or more of receive processor 238, transmit processor 220, or controller 240, and memory 354 includes or corresponds to memory 242.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

Access point may include a variety of components (such as structural, hardware components) used for carrying out one or more functions described herein. For example, these components may include one or more processors 372 (hereinafter referred to collectively as "processor 372"), one or more memory devices 374 (hereinafter referred to collectively as "memory 374"), one or more transmitters 376 (hereinafter referred to collectively as "transmitter 376"), and one or more receivers 378 (hereinafter referred to collectively as "receiver 378"). Processor 372 may be configured to execute instructions stored in memory 374 to initiate, perform, or control one or more operations described herein.

Transmitter 376 is configured to transmit reference signals, synchronization signals, control information and data to one or more other devices, and receiver 378 is configured to receive reference signals, control information and data from one or more other devices. For example, transmitter 376 may transmit signaling, control information and data to, and receiver 378 may receive signaling, control information and data from, UE 115. In some implementations, transmitter 376 and receiver 378 may be integrated in one or more transceivers.

To further illustrate, in some examples, access point 370 communicates with UE 115 using a Wi-Fi communication network. In some other examples, access point 370 may communicate with UE 115 using one or more other networks, such as an ultra-wideband (UWB) communication network.

In some examples, the access point 370 may be co-located with one or more devices of a cellular network, such as one or more devices of a 5G NR network that includes the base station 105 and the core network 130. For example, the one or more devices may include the TRP 390. In some examples, the TRP 390 and the access point 370 may be positioned at a common location. In some examples, the TRP 390 may be mounted on or attached to a housing of the access point 370. In some other examples, the access point 370 may be mounted on or attached to a housing of the TRP 390. In some other examples, the access point 370 and the TRP 390 may be attached to or included within a common housing or device. The access point 370 may communicate with the TRP 390, such as via an Ethernet connection, a backhaul network, or another type of connection. In some examples, TRP 390 may communicate with base station 105 (e.g., to provide information from access point 370 to base station 105).

Core network 130 may include a 4G core network, a 5G core network, an evolved packet core (EPC), another core network, or a combination thereof. Core network 130 may be coupled, such as communicatively coupled, to base station 105, access point 370, or both. Core network 130 may include LMF 131. Although shown and described as being included in core network 130, LMF 131 may be distinct from core network 130 in some implementations. For example the LMF 131 may include one or more servers, such as multiple distributed servers. LMF 131 may be configured to support various functionality, such as managing support for different location services for one or more UEs. For example, LMF 131 is configured to control the positioning parameters for UEs 115 and the LMF 131 can provide information to the base stations 105 and UE 115 so that action can be taken at UE 115. Base stations 105 may forward location messages to the LMF 131 and may communicate with the LMF 131 via a NR Positioning Protocol A (NRPPa). In some implementations, UE 115 and base station 105 are configured to communicate with the LMF 131 via an Access and Mobility Management Function (AMF).

In some implementations, access points of the wireless communications system 300 (such as access point 370) may be coupled to the core network 130 via one or more devices. In some examples, one or more of the access points may be coupled to the core network 130 via an interworking function device, such as a non-3GPP interworking function (N3IWF) device. In such examples, the one or more access points may be referred to as untrusted access points. In some other examples, one or more of the access points may be coupled to the core network 130 via a gateway function device, such as a trusted non-3GPP gateway function (TNGF) device. In such examples, the one or more access points may be referred to as trusted access points. A trusted access point may be referred to as a trusted non-3GPP access point (TNAP). In some implementations, an untrusted access point may not have connectivity to the LMF 131.

In some implementations, wireless communications system 300 includes a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP. In such examples, core network 130 may include or correspond to a 5G NR core network.

During operation of wireless communications system 300, the UE 115 may transmit messages to and may receive messages from devices of the wireless communication system 300. For example, the LMF 131 may generate message for the UE 115, and may transmit the message to the base station 105 to be relayed to the UE 115. Although some such messages are described for convenience as being received from the base station 105, it is noted that such messages may originate from LMF 131 (or another device of the core network 130) in some cases.

As another example, the UE 115 and the access point 370 may perform a positioning procedure 360. For example, the positioning procedure 360 may include or correspond to a Wi-Fi fine time measurement (FTM) procedure or another procedure.

In some examples, the positioning procedure 360 may be associated with an initiator entity and a responder entity. The initiator entity may correspond to one of the UE 115 or the access point 370, and the responder entity may correspond to the other of the UE 115 or the access point 370. To initiate the positioning procedure 360, the initiator entity may transmit a request to the to the responder entity. The responder entity may acknowledge the request. During the positioning procedure 360, the initiator entity and the responder entity may each perform one or more operations of the positioning procedure 360. For example, the UE 115 may perform one or more operations of the positioning procedure 360 to determine measurements 303 associated with the positioning procedure 360, and the access point 370 may perform one or more operations of the positioning procedure 360 to determine measurements 373 associated with the positioning procedure 360.

To further illustrate, the responder entity may transmit (e.g., at a time $t\_1$) a reference message 362 to the initiator entity. Based on receiving the reference message 362 (e.g., at a time $t\_2$), the initiator entity may transmit (e.g., at a time $t\_3$) an acknowledgement (ACK) 364 to the responder entity. The responder entity may receive the ACK 364 (e.g., at a time $t\_4$). In some examples, the measurements 303 may indicate times $t\_1$ and $t\_3$, and the measurements 373 may indicate times $t\_2$ and $t\_4$. In some other examples, the measurements 303 may indicate times $t\_2$ and $t\_4$, and the measurements 373 may indicate times $t\_1$ and $t\_3$.

In some implementations, the UE 115 the access point 370 may perform measurement exchange of any of the measurements 303, 373. For example, the UE 115 may transmit the measurements 303 to the access point 370. Alternatively or additionally, the access point 370 may transmit the measurements 373 to the UE 115.

A measurement entity (e.g., the UE 115 or the access point 370) may determine a time interval based on the measurements 303, 373. The time interval may be referred to as a roundtrip time (RTT) burst. The positioning procedure 360 may include performing n RTT bursts, where n≥1. In some examples, the measurement entity may determine a roundtrip time (RTT) (e.g., an average RTT over the n RTT bursts) associated with the positioning procedure 360 based on the n RTT bursts. For example, the RTT may be determined based on Equation 1:

$$RTT = \frac{1}{n} \cdot \sum_{k=1}^{n} ([t\_4(k) - t\_1(k)] - [t\_3(k) - t\_2(k)]).$$ (Equation 1)

A reporting entity may transmit a measurement report 340 indicating one or more results 342 (e.g., the RTT) of the positioning procedure 360 to one or more devices, such as a device of the core network 130 (e.g., the LMF 131) or the base station 105. The reporting entity may correspond to one or both of the UE 115 or the access point 370. In some examples, the base station 105 may receive the measurement report 340 and may relay the measurement report 340 to one or more devices of the core network 130, such as the LMF 131. The measurement report 340 may include an identifier of one or both of the UE 115 or the access point 370.

In some examples, the one or more results 342 include one or more of the measurements 303, the measurements 373, or the RTT of the positioning procedure 360. Alternatively or in addition, the one or more results 342 may indicate a range value (e.g., distance between the UE 115 and the access point 370) based on the measurements 303, the measurements 373, and the RTT of the positioning procedure 360. Alternatively or additionally, the one or more results 342 may include one or more of a downlink angle-of-departure (DL-AoD) associated with the positioning procedure 360, an uplink angle-of-arrival (UL-AoA) associated with the positioning procedure 360, a reference signal received power (RSRP) associated with the positioning procedure 360, a line-of-sight (LOS) or non-line-of-sight (NLOS) indicator associated with the positioning procedure 360 (e.g., an indication of whether the UE 115 detects an LOS or NLOS path between the UE 115 and the access point 370), or a timestamp associated with the positioning procedure 360 (e.g., a time at which one or more measurements or computations are performed, such as a time at which an RTT value is determined). To further illustrate, in some examples, the LOS or NLOS indicator may include or correspond to a bit having one of a first value (e.g., "0" or "1") to indicate an LOS path or a second value (e.g., "1" or "0") to indicate an NLOS path.

In some aspects of the disclosure, one or both of the UE 115 or the access point 370 may receive assistance data 324 (e.g., the assistance data 150) that includes information that assists in one or more of initiating, performing, or reporting results of the positioning procedure 360. In some examples, LMF 131 or the base station 105 transmits the assistance data 324 to one or more of the UE 115 or the access point 370. In some other examples, one or more of the UE 115 or the access point 370 may receive the assistance data 324 from another access point that may be included in the wireless communications system 300.

The assistance data 324 may indicate one or more access points 326, such as the access point 370, one or more other access points, or a combination thereof. For example, the one or more access points 326 may correspond to neighboring access points of the UE 115 that are within (or that are estimated to be within) wireless communication range of the UE 115. The assistance data 324 may indicate the one or more access points 326 to the UE 115 to enable the UE 115 to select a particular access point (or multiple particular access points) for the positioning procedure 360. In some examples, the LMF 131 may identify the one or more access points 326 based on an estimated location 380 of the UE 115 supplied by the LMF 131. For example, the estimated location 380 may correspond to or may be based on a serving cell associated with the UE 115, a tracking area (TA) associated with the UE 115, or a most recent position of the UE 115, as illustrative examples. In some examples, the estimated location 380 may be determined by the LMF 131.

The one or more access points 326 may be identified based on a trust type 328 (e.g., the trust type 152) associated with each of the one or more access points 326, such as by selecting the one or more access points 326 based on the one or more access points 326 being trusted access points. To further illustrate, the one or more access points 326 may be identified based on a determination one or more of that the one or more access points 326 are registered with the LMF 131, that the one or more access points 326 are in communication with the LMF 131, or that the LMF 131 has capability to provide the assistance data 324 for the positioning procedure 360 for the one or more access points 326.

The assistance data 324 may indicate the trust type 328 associated with each access point of the one or more access points 326. In some examples, the trust type 328 indicates, for each access point of the one or more access points 326, whether the access point is associated with one of an untrusted status or a trusted status. As an illustrative example, the assistance data 324 may include, for each access point of the one or more access points 326, a bit having one of a first value (e.g., a logic one value or a logic zero value) indicating that the access point is untrusted or a second value (e.g., a logic zero value or a logic one value) indicating that the access point is trusted.

In some examples, the UE 115 may select the access point 370 from among the one or more access points 326 based on the trust type 328 associated with the access point 370. For example, the UE 115 may select the access point 370 from among the one or more access points 326 based on the trust type 328 associated with the access point 370 indicating that the access point 370 is a trusted access point, based on the trust type 328 of another access point indicating that the other access point is an untrusted access point, or a combination thereof.

Alternatively or additionally, the UE 115 may determine a connection technique for connecting the access point 370 based on the trust type 328 associated with the access point 370. For example, in some wireless communication protocols, if the access point 370 is an untrusted access point, the UE 115 may select and connect with an access network (such as a non-3GPP access network (NTAN)) and may select, independently of the access network, a public land mobile network (PLMN) and an N3IWF device within the PLMN. Further, in some wireless communication protocols, if the access point 370 is a trusted access point, the UE 115 select a PLMN and may select an access network based on the PLMN, such as by selecting a non-3GPP access network (TNAN) that supports trusted connectivity to the selected PLMN.

In some implementations, the UE 115 may transmit a capability message 320 to the LMF 131, and the LMF 131 may transmit the assistance data 324 to the UE 115 based on the capability message 320. The capability message 320 may indicate one or more capabilities of the UE 115 associated with the positioning procedure 360. To illustrate, the capability message 320 may indicate that the UE 115 has the capability to perform the positioning procedure 360 (e.g., by indicating that the UE 115 has the capability to perform a Wi-Fi FTM procedure that may be included in or that may correspond to the positioning procedure 360). As another example, the capability message 320 may indicate whether the UE 115 has the capability to function as one or more of the initiator entity, responder entity, measurement entity, or reporting entity of the positioning procedure 360.

To further illustrate, the LMF 131 may provide (e.g., via the base station 105 or another device) a parameter configuration 330 to one or more of the UE 115 or the access point 370. The parameter configuration 330 may be included in the assistance data 324, in a message that includes the assistance data 324, or in another message. The parameter configuration 330 may indicate one or more measurement parameters 332 associated with the positioning procedure 360, one or more reporting parameters 334 associated with the measurement report 340 of the positioning procedure 360, or a combination thereof. To further illustrate, the parameter configuration 330 may indicate one or more of an initiator entity associated with the positioning procedure 360 (e.g., by designating one of the UE 115 or the access point 370 as the initiator entity), a responder entity associated with the positioning procedure 360 (e.g., by designating the other of the UE 115 or the access point 370 as the responder entity), a measurement entity associated with the positioning procedure 360 (e.g., by designating one of the UE 115 or the access point 370 as the measurement entity), or a reporting entity associated with the positioning procedure 360 (e.g., by designating one or both of the UE 115 or the access point 370 as the reporting entity).

Alternatively or additionally, the parameter configuration 330 may indicate one or more of a size of the measurement report 340 (e.g., a "maximum" data size of the measurement report 340, a "minimum" data size of the measurement report 340) or a number of RTT bursts (e.g., n) associated with the positioning procedure 360, or a sub-band size for the measurement report 340. In some implementations, the sub-band size may be based at least in part on a bandwidth associated with the access point 370. To illustrate, if the bandwidth is 400 megahertz (MHz), the positioning procedure 360 may be performed in two sub-band portions (or "chunks") of 200 MHz. In such examples, the positioning procedure 360 may include performing one or more RTT bursts for each of the sub-band portions and determining an RTT for each of the multiple RTT bursts. The measurement report 340 may include results for each of the sub-band portions (e.g., a respective range value for the each of the sub-band portions). In some cases, multiple results for different sub-band portions may improve accuracy or reliability or some operations, such as range determination.

Alternatively additionally, the parameter configuration 330 may specify a ranging technique for the positioning procedure 360. For example, the parameter configuration 330 may indicate one of a single-sided two-way ranging (SS-TWR) technique or a double-sided two-way ranging (DS-TWR) technique for the positioning procedure 360.

Alternatively or additionally, the parameter configuration 330 may specify that the measurement report 340 is to include one or more other parameters described herein. For example, the parameter configuration 330 may specify that the measurement report 340 is to include a DL-AoD associated with the positioning procedure 360, an UL-AoA associated with the positioning procedure 360, an RSRP associated with the positioning procedure 360, an LOS or NLOS indicator associated with the positioning procedure 360, or a timestamp associated with the positioning procedure 360.

In some examples, one or more parameters indicated by the parameter configuration 330 may be specific to a particular device, such as the access point 370. To illustrate, the parameter configuration 330 may indicate whether the measurement report 340 is to include, for each RTT burst, reporting of a range of RTT values (e.g., the maximum and minimum of $t\_1$, $t\_2$, $t\_3$, and $t\_4$) or reporting of each individual value (e.g., each of $t\_1$, $t\_2$, $t\_3$, and $t\_4$).

In some aspects of the disclosure, the positioning procedure 360 may correspond to a UE-based (or "standalone") positioning procedure. In some examples of a UE-based positioning procedure, the access point 370 may provide the measurement report 340 to the UE 115 or may provide the measurement report 340 to the LMF 131, and the LMF 131 may forward the measurement report 340 to the UE 115. In some other aspects of the disclosure, the positioning procedure 360 may correspond to a UE-assisted positioning procedure. In some examples of a UE-assisted positioning procedure, the access point 370 may correspond to the measurement entity and may provide the measurement report 340 to the LMF 131. In some other examples of a UE-assisted positioning procedure, the UE 115 370 may correspond to the measurement entity and may provide the measurement report 340 to the LMF 131 (e.g., via the base station 105, via the access point 370, or via one or more other devices).

To further illustrate, the example of Table 1 indicates certain example parameters that may be included the measurement report 340 in some implementations of a UE-assisted positioning procedure and in some implementations of a UE-based (or "standalone") positioning procedure. It is noted that Table 1 is provided for illustration and that other examples are also within the scope of the disclosure. In some examples, information indicated by "yes" in Table 1 may be reported by the UE 115 to the LMF 131 via the measurement report 340.

TABLE 1

| Information | UE-assisted positioning procedure | UE-based ("standalone") positioning procedure |
|---|---|---|
| Access Point Location Information | | |
| BSSID | Yes | |
| SSID | Yes | |
| RSSI | Yes | |
| Timestamp | Yes | |
| Measurement characteristic(s) | Yes | |
| UE Location Information | | |
| UE position estimate | | Yes |
| Position timestamp | | Yes |
| Location source | | Yes |
| Other Information | | |
| UL-AoA | Yes | Yes |
| DL-AoD | Yes | Yes |
| LOS or NLOS Indicator | Yes | Yes |

In some examples, the assistance data 324 is included in a system information block (SIB), such as a positioning SIB (posSIB). To further illustrate, the base station 105 may transmit the assistance data 324 via a broadcast posSIB that may be received by multiple UEs including the UE 115. In some other examples, the base station 105 may transmit the assistance data 324 via a unicast transmission to the UE 115 or via a groupcast transmission to a group of UEs including the UE 115. In some other examples, the base station 105 may transmit the assistance data 324 via an on-demand SIB associated with the UE 115, such as in response to a request from the UE 115, which may include or which may correspond to the capability message 320.

In another example, a first access point may provide the assistance data 324 directly to the UE 115. The first access point may correspond to the access point 370. In another example, a second access point may provide the assistance data 324 for a group of access points, such as a group of neighboring access points within a threshold proximity of the second access point. In some examples, the group of neighboring access points may distribute the assistance data 324, such as by transmitting the assistance data 324 to the UE 115. Depending on the example, the access point 370 may correspond to the second access point or may be included in the group of neighboring access points.

Other implementations of the assistance data 324 are also within the scope of the disclosure. For example, the assistance data 324 may indicate one or more other parameters, such as a measurement window for the positioning procedure 360 (e.g., in connection with a SIB implementation of the assistance data 324). In some examples, a simplified version of the assistance data 324 may indicate frequencies at which to search for access points. The assistance data 324 may indicate a threshold bandwidth for each RTT burst or measurement (e.g., where the UE 115 avoids performing the positioning procedure with an access point if the access point uses less than the threshold bandwidth). The assistance data 324 may indicate measurement configuration values for the positioning procedure 360, such as one or more of a number of RTT bursts or a number of frames per RTT burst. The assistance data 324 may further indicate, for each of the one or more access points 326, one or more of a basic service set identification (BSSID) associated with the access point, a service set identification (SSID) associated with the access point, type data associated with the access point, or a location of the access point. In some examples, the type data may indicate one or more of a wireless communication protocol used by the access point, a transmit power of the access point, an antenna gain of the access point, or a coverage area associated with the access point, as illustrative examples.

In some implementations, prior to (or without) receiving the assistance data 324, the UE 115 may perform a search 319 for candidate access points 306. For example, the UE 115 may scan for beacons or other communications from the candidate access points 306 or may transmit probe queries seeking responses indicating that the candidate access points 306 have capability to perform the positioning procedure 360. In some examples, the UE 115 may receive (e.g., prior to receiving the assistance data 324) a request 322 for the UE 115 to perform the search 319 for the candidate access points 306.

In some examples, the request 322 indicates that the search 319 is for untrusted access points. In some such examples, the search 319 may include or correspond to an access network discovery and selection (ANDSP) search.

In some other examples, the request 322 indicates that the search 319 is for trusted access points. In some such examples, the search 319 may include or correspond to an access network query protocol (ANQP) search.

In some implementations, the request 322 may indicate one or more search parameters for the search 319. As an illustrative example, the one or more search parameters may include one or more frequencies to scan during the search 319. To further illustrate, in some implementations, an amount of candidate frequencies to be searched may be relatively large, such as greater than 500 MHz in a 5 gigahertz (GHz) band, or greater than 1 GHz in a 6 GHz band. In such examples, the request 322 may reduce a number of frequencies to be scanned by indicating a reduced number of frequencies in the request 322.

The UE 115 may transmit, based on a result of the search 319, a list 346 of the candidate access points 308. For example, the UE 115 may transmit the list 346 to the base station 105, and the base station 105 may relay the list 346 to the LMF 131. In some examples, the list 346 may include capability information or other parameters associated with the candidate access points 308.

In some examples, the LMF 131 may generate the assistance data 324 based on the list 346. To further illustrate, the LMF 131 may select the one or more access points 326 from among the candidate access points 308 based on the one or more access points 326 corresponding to trusted access points. Alternatively or in addition, the LMF 131 may select the one or more access points 326 from among the candidate access points 308 based on a communication capability of the one or more access points 326, such as based on a determination that the LMF 131 is able to communicate with the one or more access points 326.

The LMF 131 may receive the measurement report 340. For example, a reporting entity (such as the UE 115 or the access point 370) may transmit the measurement report 340, such as to the base station 105 or to another device that is communication with the core network 130. The base station 105 or other device may forward the measurement report 340 to the LMF 131. In some examples, the LMF 131 may perform one or more operations based on the one or more results. For example, the LMF 131 may update the estimated location 380 of the UE 115. To illustrate, the one or more results 342 may include a range value (e.g., a distance between the UE 115 and the access point 370) and may further include one or more direction measurements, such as a DL-AoD measured by the UE 115 based on the positioning procedure 360, an UL-AoA measured by the access point 370, based on the positioning procedure 360, or both. The LMF 131 may determine an updated location of the UE 115 based on the range value and the one or more direction measurements (e.g., by intersecting a circumference indicated by the range value with a direction measurement).

In some examples, the LMF 131 may determine or estimate a reliability or accuracy of the one or more results 342 based on one or more other parameters associated with the measurement report 340, such as based on one or more of a direction value (e.g., an UL-AoA or a DL-AoD), an LOS indicator, or an NLOS indicator. In some examples, the one or more other parameters may enable the LMF to weight the one or more results 342 in combination with results of another positioning procedure (such as a 5G NR positioning procedure).

Alternatively or in addition, the LMF 131 may modify or update content of the assistance data 324 based on the measurement report 340, such as by updating the one or more access points 326. The UE 115 may receive the update to the assistance data 324 and may perform one or more subsequent positioning procedures 360 based on the update to the one or more access points 326. To further illustrate, the LMF 131 may adjust the one or more access points 326 to reduce network traffic, to reduce power consumption of the UE 115, to reduce a geometric dilution of precisions (GDOP), or based on a particular channel quality condition (e.g., a poor channel quality condition failing to satisfy a threshold channel quality condition). In some examples, the LMF 131 may perform one or more such operations based on a determination that a link between the UE 115 and the access point 370 may be in NLOS or may be associated with a multipath condition, reducing measurement accuracy or quality.

In some circumstances, one or both of the UE 115 or the access point 370 may be unable to perform or complete the positioning procedure 360. For example, in some circumstances, the UE 115 may move out of range of the access point 370 prior to performing or completing the positioning procedure 360. In such cases, the measurement report 340 may indicate failure to perform or complete the positioning procedure 360. In some examples, the measurement report 340 may specify a cause of the failure to perform or complete the positioning procedure 360.

In some implementations, the access point 370 may communicate with the LMF 131 (e.g., via one or more devices of the core network 130), such as to provide the measurement report 340 to the LMF 131. In some aspects of the disclosure, an identity of the UE 115 is indicated in communications between the access point 370 and the LMF 131. The particular identity used in the communications may be based at least in part on whether the access point 370 is trusted or untrusted. To illustrate, if the access point 370 is trusted, the identity may include or correspond to a cellular network identity 382 of the UE 115, such as a global unique temporary identifier (GUTI) that may be associated with a 5G NR wireless communication network. The access point 370 may store mapping data indicating a correspondence between the cellular network identity 382 and a WLAN identity 384 used by the access point 370 in connection with WLAN communications with the UE 115. The WLAN identity 384 may include or correspond to a media access control (MAC) address of the UE 115 or an Internet Protocol (IP) address associated with the UE 115, as illustrative examples.

In some other examples, the access point 370 may be untrusted. In some such examples, the cellular network identity 382 of the UE 115 may be hidden or concealed from the access point 370. To enable concealment of the cellular network identity 382 of the UE 115 from the access point 370, the UE 115 may indicate the WLAN identity 384 of the UE 115 to the LMF 131, and the LMF 131 may store mapping data indicating a correspondence between the cellular network identity 382 of the UE 115 and the WLAN identity 384 of the UE 115. The LMF 131 may communicate with the access point 370 based on the WLAN identity 384 of the UE 115 (e.g., instead of based on the cellular network identity of the UE 115). Accordingly, the cellular network identity 382 may be hidden or concealed from an untrusted access point, which may enhance security and privacy.

In some examples, the access point 370 and the TRP 390 may be configured by a cellular network (such as by the core network 130) to report to the cellular network (e.g., via the measurement report 340 or via another report) one or more of WLAN measurements or cellular measurements. For example, the measurement report 340 may correspond to a "hybrid" report that includes WLAN measurements performed by the access point 370 and cellular measurements performed by the TRP 390. To further illustrate, the measurement report 340 may include a range value determined by the access point 370 based on a WLAN technique (e.g., based on the positioning procedure 360) and may further include a direction value determined by the TRP 390 (e.g., an identification of one or more beams used by the TRP 390 to communicate with the UE 115).

In some examples, a technique for reporting the measurement report 340 may be selected based at least in part on the trust type 328 associated with the access point 370. To illustrate, in some implementations, if the access point 370 is untrusted, the access point 370 may be unable to communicate with the LMF 131. In some such examples, the UE 115 may function as the reporting entity of the positioning procedure 360. In some other cases, if the access point 370 is trusted, the access point 370 may be able to communicate with the LMF 131. In some such examples, the access point 370 or the UE 115 may function as the reporting entity of the positioning procedure 360.

One or more aspects described herein may improve operation of the wireless communication system 300. For example, by indicating the trust type 328, the UE 115 may identify a trusted access point for the positioning procedure 360, which may enhance security or privacy in some cases. Further, by selecting the 370 access point for the positioning procedure 360 based on the access point 370 having a connection to the LMF 131, the access point 370 may perform transmission of the measurement report 340 to the LMF 131, which may reduce usage of wireless resources of the wireless communication system 300 in some cases. Accordingly, operation of one or more devices within the wireless communication system 300 may be enhanced.

Alternatively or in addition, reporting of one or more parameters (such as one or more of a direction value or an LOS indicator) may enable the LMF 131 to determine or estimate a reliability or accuracy of one or more results 342, which may enable the LMF 131 to weight the one or more results 342 in combination with results of another positioning procedure, such as a 5G NR positioning procedure. In some implementations, based on the measurement report 340, the LMF 131 may modify one or more subsequent positioning procedures based on an update to the one or more access points 326 indicated by the assistance data 324. To further illustrate, the LMF 131 may adjust the one or more access points 326 indicated by the assistance data 324 to reduce network traffic, to reduce power consumption of the UE 115, to reduce a geometric dilution of precisions (GDOP), or to avoid poor channel quality conditions in some cases (such as based on a determination that a link between the UE 115 and the access point 370 may be in NLOS or may be associated with a multipath condition, reducing measurement accuracy or quality). As a result, operation of one or more devices within the wireless communication system 300 may be enhanced.

Figure 4:
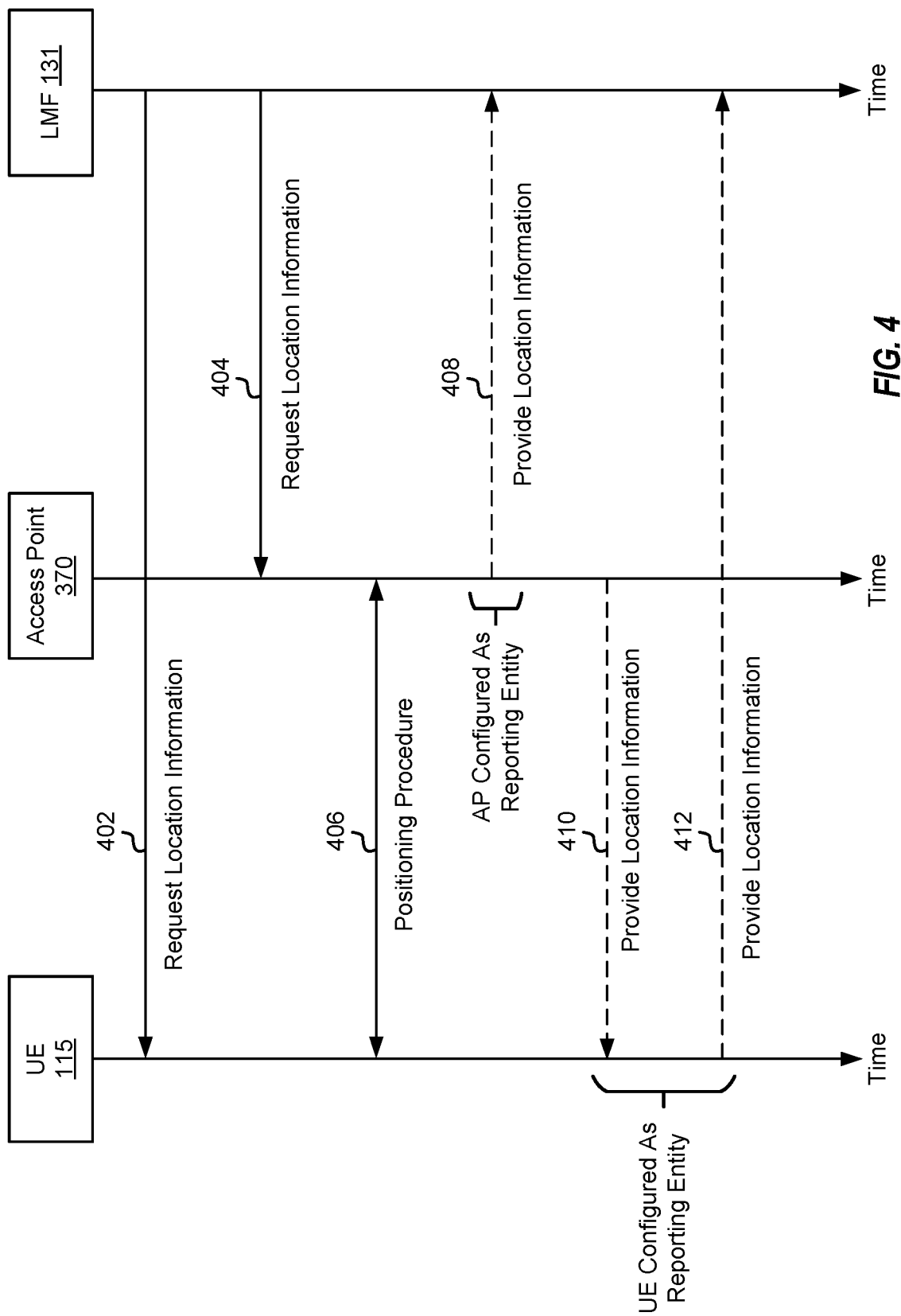
FIG. 4 is a ladder diagram illustrating certain operations that may be performed by a wireless communications system, such as the wireless communications system of FIG. 3, that supports access point assisted positioning according to one or more aspects.

FIG. 4 is a ladder diagram illustrating certain operations that may be performed by a wireless communications system, such as the wireless communications system 300 of FIG. 3, that supports access point assisted positioning according to one or more aspects. In some examples, the operations of FIG. 4 may be performed by the UE 115, the access point 370, and the LMF 131.

The LMF 131 may transmit (e.g., via the base station 105) one or more of a first request location information message to the UE 115, at 402, or a second request location information message to the access point 370, at 404. To illustrate, the first request location information message may include the assistance data 324, and the second request location information message may include an identifier of the UE 115, such as a logical address associated with the UE 115. In some examples, one or more of the first request location information message or the second request location information message may indicate the parameter configuration 330, such as one or more of a number of RTT bursts to be performed during the positioning procedure 360 or a configuration of a reporting entity for the positioning procedure 360, as illustrative examples.

The UE 115 and the access point 370 may perform a positioning procedure, at 406. The positioning procedure may correspond to the positioning procedure 360.

In some examples, the access point 370 may be configured as the reporting entity (e.g., based on the second request location information message). In such examples, the access point 370 may transmit a measurement report to the LMF 131 (e.g., via the base station 105), at 408. The measurement report may correspond to the measurement report 340.

In some other examples, the UE 115 may be configured as the reporting entity (e.g., based on the first request location information message). In such examples, the access point 370 may transmit a measurement report to the UE 115, at 410, and the UE 115 may transmit the measurement report to LMF 131 (e.g., via the base station 105), at 412. The measurement report may correspond to the measurement report 340.

FIG. 5 is a flow diagram illustrating an example process 500 that supports access point assisted positioning according to one or more aspects. In some examples, the process 500 is performed by a UE, such as the UE 115.

The process 500 includes receiving assistance data associated with a positioning procedure, at 502. The assistance data indicates one or more access points and further indicates, for each of the one or more access points, a type associated with a connection to a cellular core network. For example, the UE 115 may receive the assistance data 324. The assistance data 324 may indicate the one or more access points 326 and may further indicate the trust type 328 of each of the one or more access points 326.

The process 500 further includes performing, based on the assistance data, one or more operations of the positioning procedure with an access point of the one or more access points, at 504. For example, the UE 115 may select the access point 370 based on the assistance data 324 and may perform measurements 303 of the positioning procedure 360 after selecting the access point 370 based on the assistance data 324.

FIG. 6 is a flow diagram illustrating an example process 600 that supports access point assisted positioning according to one or more aspects. In some examples, the process 600 is performed by a UE, such as the UE 115.

The process 600 includes performing one or more operations of a positioning procedure between a UE and an access point, at 602. For example, the UE 115 may perform the measurements 303 of the positioning procedure 360.

The process 600 further includes transmitting a measurement report that is based on the positioning procedure, at 604. The measurement report indicates one or more results of the positioning procedure, and the one or more results include one or more of a direction value indicating an estimated angle between the UE and the access point or an indication of whether a line-of-sight (LOS) is detected between the UE and the access point. For example, the measurement report 340 may indicate the one or more results 342 of the positioning procedure 360. The one or more results 342 may include one or more of a direction value indicating an estimated angle between the UE and the access point or an indication of whether an LOS is detected between the UE 115 and the access point 370.

FIG. 7 is a block diagram of an example UE 115 that supports access point assisted positioning according to one or more aspects. The UE 115 may include structure, hardware, or components illustrated in FIG. 2. For example, the UE 115 may include the controller 280, which may execute instructions stored in the memory 282. Using the controller 280, the UE 115 may transmit and receive signals via wireless radios 701a-r and antennas 252a-r. The wireless radios 701a-r may include one or more components or devices described herein, such as the modulator/demodulators 254a-r, the MIMO detector 256, the receive processor 258, the transmit processor 264, the TX MIMO processor 266, the transmitter 316, the receiver 318, one or more other components or devices, or a combination thereof.

In some examples, the memory 282 may store instructions executable by one or more processors (e.g., the controller 280) to initiate, perform, or control one or more operations described herein. For example, the memory 282 may store access point selection instructions 702 executable by the controller 280 to control reception of the assistance data 324 and to select the access point 370 based on the assistance data 324. As another example, the memory 282 may store positioning procedure instructions 704 executable by the controller 280 to initiate, perform, or control one or more operations of the positioning procedure 360. As an additional example, the memory 282 may store access point selection instructions 702 executable by the controller 280 to initiate transmission of the measurement report 340 to the base station 105.

FIG. 8 is a flow diagram illustrating an example process 800 that supports access point assisted positioning according to one or more aspects. In some examples, the process 800 is performed by a base station, such as the base station 105.

The process 800 includes transmitting assistance data associated with a positioning procedure between a UE and an access point, at 802. The assistance data indicates one or more access points and further indicates, for each of the one or more access points, a type associated with a connection to a cellular core network. For example, the base station 105 may transmit the assistance data 324. The assistance data 324 may indicate the one or more access points 326 and may further indicate the trust type 328 of each of the one or more access points 326.

The process 800 further includes receiving a measurement report that is based on the positioning procedure, at 804. The measurement report indicates one or more results of the positioning procedure. For example, the base station 105 may receive the measurement report 340 from the UE 115 or from the access point 370.

FIG. 9 is a block diagram of an example base station 105 that supports access point assisted positioning according to one or more aspects. The base station 105 may include structure, hardware, and components illustrated in FIG. 2. For example, the base station 105 may include the controller 240, which may execute instructions stored in memory 242. Under control of the controller 240, the base station 105 may transmit and receive signals via wireless radios 901a-t and antennas 234a-t. The wireless radios 901a-t may include one or more components or devices described herein, such as the modulator/demodulators 232a-t, the MIMO detector 236, the receive processor 238, the transmit processor 220, the TX MIMO processor 230, the transmitter 356, the receiver 358, one or more other components or devices, or a combination thereof.

In some examples, the memory 242 may store instructions executable by one or more processors (e.g., the controller 240) to initiate, perform, or control one or more operations described herein. For example, the memory 242 may store assistance data transmission instructions 902 executable by the controller 240 to initiate transmission of the assistance data 324. As another example, the memory 242 may store measurement report reception instructions 904 executable by the controller 240 to control reception of the measurement report 340 from the UE 115 or from the access point 370.

In a first aspect, a method for wireless communication performed by a user equipment (UE) includes receiving assistance data associated with a positioning procedure. The assistance data indicates one or more access points and further indicates, for each of the one or more access points, a type associated with a connection to a cellular core network. The method further includes performing, based on the assistance data, one or more operations of the positioning procedure with an access point of the one or more access points.

In a second aspect, in combination with the first aspect, the type for the access point indicates that the access point is associated with one of an untrusted status or a trusted status.

In a third aspect, in combination with one or more of the first aspect or the second aspect, the access point is associated with the untrusted status based at least in part on the access point communicating with the cellular core network via an interworking function device, and the access point is associated with the trusted status based at least in part on the access point communicating with the cellular core network via a gateway function device.

In a fourth aspect, in combination with one or more of the first aspect through the third aspect, the assistance data indicates the one or more access points for the positioning procedure that are identified based on one or more of an estimated location of the UE provided by a location management function (LMF) or a determination one or more of that the one or more access points are registered with the LMF, that the one or more access points are in communication with the LMF, or that the LMF has capability to provide the assistance data for the positioning procedure for the one or more access points.

In a fifth aspect, in combination with one or more of the first aspect through the fourth aspect, the estimated location corresponds to or is based on a serving cell associated with the UE, a tracking area (TA) associated with the UE, or a most recent position of the UE.

In a sixth aspect, in combination with one or more of the first aspect through the fifth aspect, the method further includes transmitting a capability message indicating one or more capabilities of the UE associated with the positioning procedure, and the assistance data is received based on the capability message.

In a seventh aspect, in combination with one or more of the first aspect through the sixth aspect, the method further includes receiving a request for the capabilities of the UE, and the UE transmits the capability message based on the request.

In an eighth aspect, in combination with one or more of the first aspect through the seventh aspect, the UE transmits the capability message without receiving a request for the capabilities of the UE.

In a ninth aspect, in combination with one or more of the first aspect through the eighth aspect, the assistance data is transmitted via a broadcast positioning system information block (posSIB), via a unicast transmission to the UE, via a groupcast to a group of UEs including the UE, via an on-demand system information block (SIB) associated with the UE, from a first access point that provides the assistance data directly to the UE, or from a second access point that provides the assistance data for a group of access points.

In a tenth aspect, in combination with one or more of the first aspect through the ninth aspect, the method further includes receiving an update to the assistance data.

In an eleventh aspect, in combination with one or more of the first aspect through the tenth aspect, the update includes updating of the one or more access points to adjust one or more of network traffic, to reduce power consumption of the UE, to reduce a geometric dilution of precisions (GDOP), or based on a particular channel quality condition.

In a twelfth aspect, an apparatus includes a memory and one or more processors coupled to the memory. The one or more processors are configured to receive assistance data associated with a positioning procedure. The assistance data indicates one or more access points and further indicates, for each of the one or more access points, a type associated with a connection to a cellular core network. The one or more processors are further configured to initiate, based on the assistance data, one or more operations of the positioning procedure with an access point of the one or more access points.

In a thirteenth aspect, in combination with the twelfth aspect, the one or more processors are further configured to receive a parameter configuration indicating one or more of: an initiator entity associated with the positioning procedure; a responder entity associated with the positioning procedure; a measurement entity associated with the positioning procedure; a reporting entity associated with the positioning procedure; a sub-band size of a measurement report associated with the positioning procedure; a number of roundtrip time (RTT) bursts associated with the positioning procedure; or one of a single-sided two-way ranging (SS-TWR) technique or a double-sided two-way ranging (DS-TWR) technique for the positioning procedure.

In a fourteenth aspect, in combination with one or more of the twelfth aspect through the thirteenth aspect, the one or more processors are further configured to initiate transmission of a measurement report associated with the positioning procedure and indicating one or more of: a roundtrip time (RTT) associated with the positioning procedure; a downlink angle-of-departure (DL-AoD) associated with the positioning procedure; an uplink angle-of-arrival (UL-AoA) associated with the positioning procedure; a reference signal received power (RSRP) associated with the positioning procedure; a line-of-sight (LOS) or non-line-of-sight (NLOS) indicator associated with the positioning procedure; or a timestamp associated with the positioning procedure.

In a fifteenth aspect, in combination with one or more of the twelfth aspect through the fourteenth aspect, the one or more processors are further configured to receive, prior to receiving the assistance data, a request to perform a search for candidate access points with capability to perform the positioning procedure.

In a sixteenth aspect, in combination with one or more of the twelfth aspect through the fifteenth aspect, the request indicates that the search is for untrusted access points, and the search corresponds to an access network discovery and selection (ANDSP) search.

In a seventeenth aspect, in combination with one or more of the twelfth aspect through the sixteenth aspect, the request indicates that the search is for trusted access points, and the search corresponds to an access network query protocol (ANQP) search.

In an eighteenth aspect, in combination with one or more of the twelfth aspect through the seventeenth aspect, the request indicates one or more search parameters for the search.

In a nineteenth aspect, in combination with one or more of the twelfth aspect through the eighteenth aspect, the one or more search parameters include one or more frequencies to scan during the search.

In a twentieth aspect, in combination with one or more of the twelfth aspect through the nineteenth aspect, the method further includes transmitting, based on a result of the search, a list indicating candidate access points with the capability to perform the positioning procedure, and the one or more access points indicated by the assistance data are based on the candidate access points.

In a twenty-first aspect, in combination with one or more of the twelfth aspect through the twentieth aspect, the one or more access points indicated by the assistance data are selected from among the candidate access points based on the one or more access points corresponding to trusted access points, based on a communication capability of the one or more access points, or a combination thereof.

In a twenty-second aspect, a method of wireless communication includes performing one or more operations of a positioning procedure between a user equipment (UE) and an access point. The method further includes transmitting a measurement report that is based on the positioning procedure. The measurement report indicates one or more results of the positioning procedure, and the one or more results include one or more of a direction value indicating an estimated angle between the UE and the access point or an indication of whether a line-of-sight (LOS) is detected between the UE and the access point.

In a twenty-third aspect, in combination with the twenty-second aspect, the direction value indicates one or more of a downlink angle-of-departure (DL-AoD) associated with the positioning procedure or an uplink angle-of-arrival (UL-AoA) associated with the positioning procedure.

In a twenty-fourth aspect, in combination with one or more of the twenty-second aspect through the twenty-third aspect, the one or more operations include one of: transmitting a reference message and receiving an acknowledgement (ACK) based on the reference message; or receiving the reference message and transmitting the ACK based on the reference message.

In a twenty-fifth aspect, in combination with one or more of the twenty-second aspect through the twenty-fourth aspect, the method further includes receiving assistance data associated with the positioning procedure, the assistance data indicates one or more access points including the access point, and the assistance data further indicates, for each of the one or more access points, a type of connection to a cellular core network.

In a twenty-sixth aspect, an apparatus includes a memory and one or more processors coupled to the memory. The one or more processors are configured to initiate transmission of assistance data associated with a positioning procedure between a user equipment (UE) and an access point. The assistance data indicates one or more access points and further indicates, for each of the one or more access points, a type associated with a connection to a cellular core network. The one or more processors are further configured receive a measurement report that is based on the positioning procedure. The measurement report indicates one or more results of the positioning procedure.

In a twenty-seventh aspect, in combination with the twenty-sixth aspect, the one or more results include one or more of a direction value indicating an estimated angle between the UE and the access point or an indication of whether a line-of-sight (LOS) is detected between the UE and the access point.

In a twenty-eighth aspect, in combination with one or more of the twenty-sixth aspect through the twenty-seventh aspect, the access point corresponds to a trusted access point, and a location management function (LMF) communicates with the access point based on a cellular network identifier of the UE.

In a twenty-ninth aspect, in combination with one or more of the twenty-sixth aspect through the twenty-eighth aspect, the access point corresponds to an untrusted access point, and a location management function (LMF) communicates with the access point based on wireless local network area (WLAN) identifier of the UE.

In a thirtieth aspect, in combination with one or more of the twenty-sixth aspect through the twenty-ninth aspect, the access point is co-located with a transmission and reception point (TRP), and the access point and the TRP are configured to report, via the measurement report, one or more of wireless local network area (WLAN) measurements or cellular measurements.

One or more features described herein may be utilized with a traditional radio access network (RAN) or with a disaggregated RAN (also referred to as an open RAN, or O-RAN). In a traditional RAN, a core, a baseband unit, and a radio head (RH) may be designed as integrated software and hardware. In a disaggregated RAN, the RAN structure individual parts or components of the RAN may be included in different devices, different locations, and/or virtualized. For example, different layers may be split among the components of the disaggregated RAN. Examples of such splitting between layers may include splitting layers between RAN components after the PDCP layer, after the lower MAC layer, after the high physical layer, and/or after the low physical layer.

In a particular disaggregated RAN structure, a central unit (CU) may be associated with (e.g., may have control of) multiple distributed units (DUs) and be associated with (e.g., may have control of) multiple radio units (RUs). The CU may include higher layer logic (such as logic for RRC and PDCP layers) and may control such operations. The DUs may include lower layer logic (such as RLC, MAC, and upper physical layer logic) and may control such operations. The RUs may include other lower layer logic (such as physical layer logic) and may control such operations. To illustrate, the DUs may handle layer 2 (e.g., MAC) functionality, and the CU or CUs may control beam and panel (e.g., RU) selection.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein may include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

A hardware and data processing apparatus that may be used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
receiving assistance data associated with a positioning procedure, the assistance data indicating one or more access points and further indicating, for each of the one or more access points, a type associated with a connection to a cellular core network; and
performing, based on the assistance data, one or more operations of the positioning procedure with an access point of the one or more access points, wherein the method of wireless communication further comprising:
receiving, prior to receiving the assistance data, a request to perform a search for candidate access points with capability to perform the positioning procedure.

2. The method of claim 1, wherein the type for the access point indicates that the access point is associated with one of an untrusted status or a trusted status.

3. The method of claim 2, wherein the access point is associated with the untrusted status based at least in part on the access point communicating with the cellular core network via an interworking function device, and wherein the access point is associated with the trusted status based at least in part on the access point communicating with the cellular core network via a gateway function device.

4. The method of claim 1, wherein the assistance data indicates the one or more access points for the positioning procedure that are identified based on one or more of an estimated location of the UE provided by a location management function (LMF) or a determination one or more of that the one or more access points are registered with the LMF, that the one or more access points are in communication with the LMF, or that the LMF has capability to provide the assistance data for the positioning procedure for the one or more access points.

5. The method of claim 4, wherein the estimated location corresponds to or is based on a serving cell associated with the UE, a tracking area (TA) associated with the UE, or a most recent position of the UE.

6. The method of claim 1, further comprising transmitting a capability message indicating one or more capabilities of the UE associated with the positioning procedure, wherein the assistance data is received based on the capability message.

7. The method of claim 6, further comprising receiving a request for the capabilities of the UE, and wherein the UE transmits the capability message based on the request.

8. The method of claim 6, wherein the UE transmits the capability message without receiving a request for the capabilities of the UE.

9. The method of claim 1, wherein the assistance data is transmitted via a broadcast positioning system information block (posSIB), via a unicast transmission to the UE, via a groupcast to a group of UEs including the UE, via an on-demand system information block (SIB) associated with the UE, from a first access point that provides the assistance data directly to the UE, or from a second access point that provides the assistance data for a group of access points.

10. The method of claim 1, further comprising receiving an update to the assistance data.

11. The method of claim 10, wherein the update includes updating of the one or more access points to adjust one or more of network traffic, to reduce power consumption of the UE, to reduce a geometric dilution of precisions (GDOP), or based on a particular channel quality condition.

12. An apparatus comprising:
a memory; and
one or more processors coupled to the memory, wherein the one or more processors are configured to:
receive assistance data associated with a positioning procedure, the assistance data indicating one or more access points and further indicating, for each of the one or more access points, a type associated with a connection to a cellular core network; and
initiate, based on the assistance data, one or more operations of the positioning procedure with an access point of the one or more access points, wherein the one or more processors are further configured to:
receive, prior to receiving the assistance data, a request to perform a search for candidate access points with capability to perform the positioning procedure.

13. The apparatus of claim 12, wherein the one or more processors are further configured to receive a parameter configuration indicating one or more of:
- an initiator entity associated with the positioning procedure;
- a responder entity associated with the positioning procedure;
- a measurement entity associated with the positioning procedure;
- a reporting entity associated with the positioning procedure;
- a sub-band size of a measurement report associated with the positioning procedure;
- a number of roundtrip time (RTT) bursts associated with the positioning procedure; or
- one of a single-sided two-way ranging (SS-TWR) technique or a double-sided two-way ranging (DS-TWR) technique for the positioning procedure.

14. The apparatus of claim 12, wherein the one or more processors are further configured to initiate transmission of a measurement report associated with the positioning procedure and indicating one or more of:
- a roundtrip time (RTT) associated with the positioning procedure;
- a downlink angle-of-departure (DL-AoD) associated with the positioning procedure;
- an uplink angle-of-arrival (UL-AoA) associated with the positioning procedure;
- a reference signal received power (RSRP) associated with the positioning procedure;
- a line-of-sight (LOS) or non-line-of-sight (NLOS) indicator associated with the positioning procedure; or
- a timestamp associated with the positioning procedure.

15. The apparatus of claim 12, wherein the request indicates that the search is for untrusted access points, and wherein the search corresponds to an access network discovery and selection (ANDSP) search.

16. The apparatus of claim 12, wherein the request indicates that the search is for trusted access points, and wherein the search corresponds to an access network query protocol (ANQP) search.

17. The apparatus of claim 12, wherein the request indicates one or more search parameters for the search.

18. The apparatus of claim 17, wherein the one or more search parameters include one or more frequencies to scan during the search.

19. The apparatus of claim 12, further comprising transmitting, based on a result of the search, a list indicating candidate access points with the capability to perform the positioning procedure, wherein the one or more access points indicated by the assistance data are based on the candidate access points.

20. The apparatus of claim 19, wherein the one or more access points indicated by the assistance data are selected from among the candidate access points based on the one or more access points corresponding to trusted access points, based on a communication capability of the one or more access points, or a combination thereof.

21. A method of wireless communication, the method comprising:
- performing one or more operations of a positioning procedure between a user equipment (UE) and an access point, wherein the one or more operations comprise receiving a request to perform a search for candidate access points with capability to perform the positioning procedure; and
- transmitting a measurement report that is based on the positioning procedure, the measurement report indicating one or more results of the positioning procedure, and the one or more results including one or more of a direction value indicating an estimated angle between the UE and the access point or an indication of whether a line-of-sight (LOS) is detected between the UE and the access point.

22. The method of claim 21, wherein the direction value indicates one or more of a downlink angle-of-departure (DL-AoD) associated with the positioning procedure or an uplink angle-of-arrival (UL-AoA) associated with the positioning procedure.

23. The method of claim 21, wherein the one or more operations include one of
- transmitting a reference message and receiving an acknowledgement (ACK) based on the reference message; or
- receiving the reference message and transmitting the ACK based on the reference message.

24. The method of claim 21, further comprising receiving assistance data associated with the positioning procedure, wherein the assistance data indicates one or more access points including the access point, and wherein the assistance data further indicates, for each of the one or more access points, a type of connection to a cellular core network.

25. An apparatus comprising:
- a memory; and
- one or more processors coupled to the memory, wherein the one or more processors are configured to:
  - initiate transmission of assistance data associated with a positioning procedure between a user equipment (UE) and an access point, the assistance data indicating one or more access points and further indicating, for each of the one or more access points, a type associated with a connection to a cellular core network; and
  - receive a measurement report that is based on the positioning procedure, the measurement report indicating one or more results of the positioning procedure, wherein the one or more processors are further configured to:
  - prior to initiating transmission of the assistance data associated with the positioning procedure, initiate transmission of a request to perform a search for candidate access points with capability to perform the positioning procedure.

26. The apparatus of claim 25, wherein the one or more results include one or more of a direction value indicating an estimated angle between the UE and the access point or an indication of whether a line-of-sight (LOS) is detected between the UE and the access point.

27. The apparatus of claim 25, wherein the access point corresponds to a trusted access point, and wherein a location management function (LMF) communicates with the access point based on a cellular network identifier of the UE.

28. The apparatus of claim 25, wherein the access point corresponds to an untrusted access point, and wherein a location management function (LMF) communicates with the access point based on wireless local network area (WLAN) identifier of the UE.

29. The apparatus of claim 25, wherein the access point is co-located with a transmission and reception point (TRP), and wherein the access point and the TRP are configured to report, via the measurement report, one or more of wireless local network area (WLAN) measurements or cellular measurements.

\* \* \* \* \*